(12) United States Patent
Minogue

(10) Patent No.: US 6,635,101 B2
(45) Date of Patent: Oct. 21, 2003

(54) RAPID SURFACE COOLING OF SOLDER DROPLETS BY FLASH EVAPORATION

(75) Inventor: Gerard R. Minogue, Kinnelon, NJ (US)

(73) Assignee: Fry's Metals, Inc., Jersey City, NJ (US)

(*) Notice: Subject to any disclaimer, the term of this patent is extended or adjusted under 35 U.S.C. 154(b) by 0 days.

(21) Appl. No.: 09/944,609

(22) Filed: Aug. 31, 2001

(65) Prior Publication Data
US 2002/0064572 A1 May 30, 2002

Related U.S. Application Data
(60) Provisional application No. 60/230,284, filed on Sep. 1, 2000.

(51) Int. Cl.$^7$ ................................................. B22F 9/08
(52) U.S. Cl. ........................................... 75/338; 264/12
(58) Field of Search ..................... 75/336, 338; 264/8, 264/12

(56) References Cited

U.S. PATENT DOCUMENTS

| | | |
|---|---|---|
| 4,347,199 A * | 8/1982 | Speier et al. ................ 264/8 |
| 5,147,448 A | 9/1992 | Roberts et al. |
| H1146 H | 3/1993 | Kapoor |
| 5,229,016 A | 7/1993 | Hayes et al. ................ 222/590 |
| 5,266,098 A | 11/1993 | Chun et al. |
| 5,294,242 A | 3/1994 | Zurecki et al. |
| 5,364,011 A | 11/1994 | Baker et al. ........... 228/180.21 |
| 5,735,931 A | 4/1998 | Featherstone ................ 75/334 |
| 5,891,212 A | 4/1999 | Tang et al. .................. 75/335 |
| 6,083,454 A | 7/2000 | Tang et al. |
| 2002/0038815 A1 * | 4/2002 | Yamaguchi et al. ........ 228/260 |

FOREIGN PATENT DOCUMENTS

WO    WO 98/36864    8/1998

* cited by examiner

Primary Examiner—George Wyszomierski
(74) Attorney, Agent, or Firm—Mintz, Levin, Cohn, Ferris, Glovsky and Popeo, P.C.

(57) ABSTRACT

A mist of liquid coolant is introduced into the path of atomized, molten, solder droplets. The mist and other conditions within the chamber are engineered to enable the liquid coolant droplets in the mist to contact the surfaces of molten solder droplets and be flash vaporized upon contact, thereby rapidly extracting heat from the molten solder droplets and accelerating cooling and solidification to produce an enhanced solder ball as a product of this process.

12 Claims, 1 Drawing Sheet

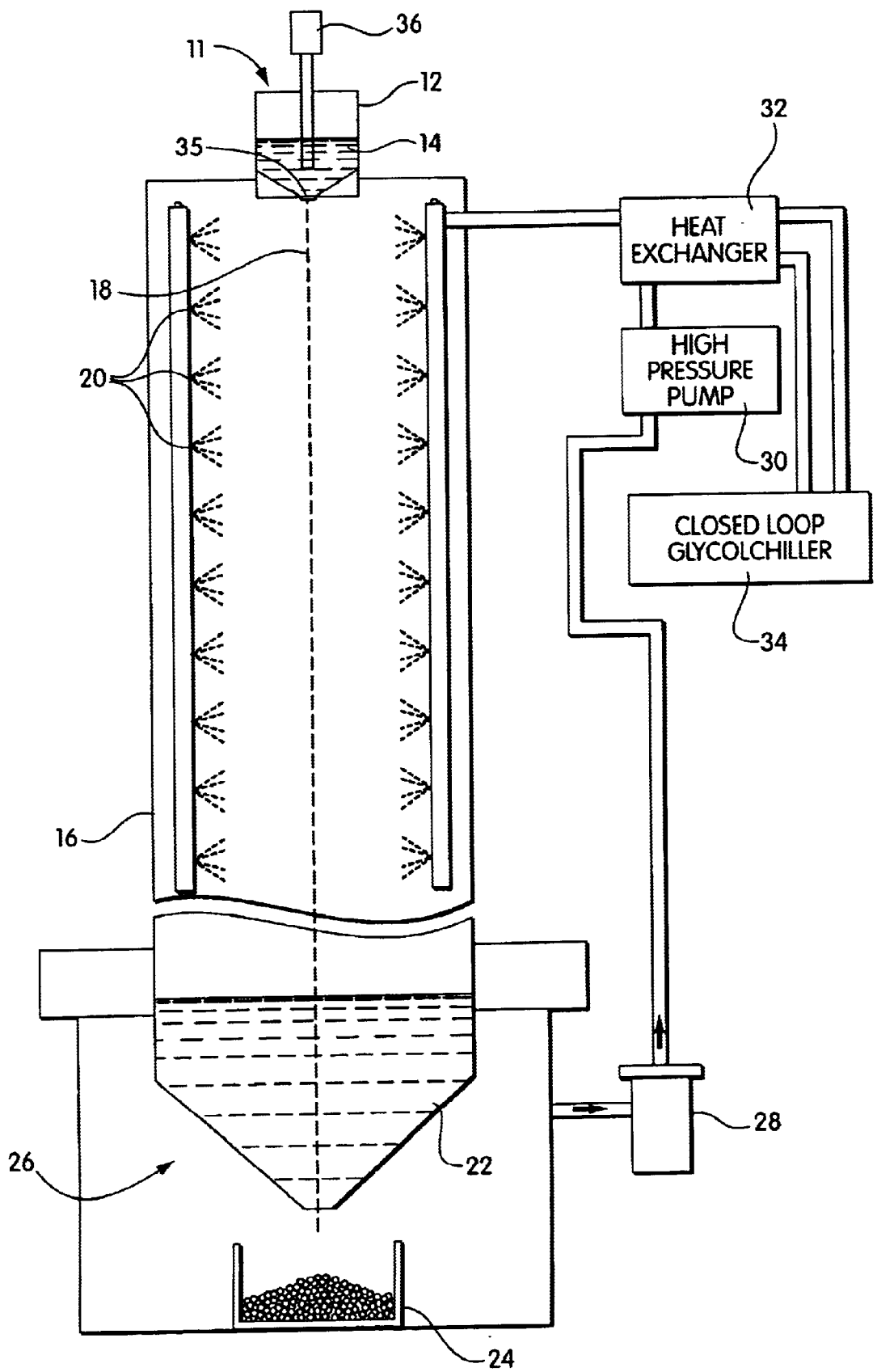

RAPID SURFACE COOLING OF SOLDER DROPLETS BY FLASH EVAPORATION

RELATED APPLICATION

This application claims priority to U.S. Provisional Patent Application No. 60/230,284, filed, Sep. 1, 2000, the entire teachings of which are incorporated herein by reference.

BACKGROUND

Surface mounting technology (SMT) is a desirable method of mounting electronic components, such as resisters, capacitors, inductors, transistors, integrated circuits, chip carriers and the like, to circuit boards and other electronics substrates, and is particularly desirable for fabricating small circuit structures. In addition, surface mounting technology lends itself well to process automation and high-density electronic manufacturing, wherein surface-mountable microelectronic devices are bonded to circuit boards and electronic substrates by solder reflowing processes.

For example, a common surface-mountable microelectronic device, referred to as a "flip chip," includes an integrated circuit device with numerous connecting leads attached to pads mounted on its underside. Either a circuit board, to which the flip will be mounted, or the flip chip itself is provided with small bumps or balls of solder (hereinafter referred to as "solder balls" or "solder spheres") that are positioned at locations on the board or the chip that correspond to the chip pads. The flip chip is mounted to the circuit board by (a) placing it in contact with the board such that the solder spheres become sandwiched between the board and the corresponding pads on the chip underside, forming an assembly; (b) heating the assembly to a point at which the solder reflows; and (c) cooling the assembly. Upon cooling, the solder hardens, thereby mounting the flip chip to the surface of the circuit board.

Tolerances in assemblies using flip chip technology are critical, as the spacing between individual microelectronic devices as well as the spacing between the chip and the circuit board is typically very small. For example, the spacing of chips from the surface of the board may be in a range of about 0.5 to about 3.0 mil (about 12.7 to about 76.2 $\mu$m), and is expected to approach micron spacing in the near future.

Electrical connections are also achieved with ball grid array (BGA) packages that are made by placing solder spheres of precisely controlled diameter and unblemished surface condition between circuit pads. Solder spheres are then heated above the liquidus temperature of the solder alloy, thereby melting the solder spheres, which wet and flow onto contact pads, creating a mechanical joint and an electrical interconnection between the circuit board and mounted component.

Solder alloys that are commonly used to manufacture solder and solder spheres for reflowing and BGA soldering applications include relatively soft base metals, such as lead, tin, silver, aluminum or copper, that can be easily damaged during manufacture of solder spheres as well as during transport and storage of solder spheres. In particular, during stream-jet fabrication of solder alloy spheres, cooling and solidification of spheres are important to the formation of smooth, unblemished and homogeneous sphere surface finishes. The cooling and solidification phases of solder sphere production are typically conducted in controlled atmospheres, such as an inert atmosphere created by nitrogen gas. However, the ability of nitrogen gas to cool solder spheres rapidly enough to form the desired surface finishes is limited by the heat transfer coefficient of nitrogen and the absolute difference between the temperatures of nitrogen gas and molten solder droplets. This limited heat transfer causes metallurgical phases to segregate on surfaces of cooling solder droplets, forming blemished surface finishes on the solidified solder spheres. In addition, the relatively slow rate of cooling facilitates the growth of large or coarse metal grains that impair surface finishes of solidified spheres.

Damage to surfaces of solder spheres can have a number of consequences. For example, automated vision systems may not be able to distinguish a solder sphere from the background if the surface reflectivity of the solder sphere has been diminished due to surface damage. Physical surface damage will also hinder the ability of most automated BGA assembly hardware to pick and place individual solder spheres. In addition, the presence of extraneous particles or grains on solder sphere surfaces may impair the mechanical function of the BGA assembly hardware. Extraneous particles and grains may also cause low resistivity or electrical shorts between contact pads on the microelectronic devices and circuit boards or other electronic substrates, as well as compromise the electrical performance of BGA joints once formed. Finally, surface damage exacerbates the oxidation of base metals of solder sphere surfaces. Surface oxidation impairs proper wetting and flow of solder spheres onto contact pads, as required with BGA packages to form reliable mechanical joints and electrical interconnections.

Existing methods of manufacturing metal spheres and fine metal powders include atomizing and centrifuging techniques, wherein a metal melt is finely divided to form molten metal droplets. Molten metal droplets are often contacted downstream of an atomizing or centrifuging location with a coolant medium to cool and solidify droplet metal into particles and spheres. Typically, the coolant medium is a gas. In some cases, others have introduced a mist in the vicinity of the atomizer to extract heat from the coolant gas.

SUMMARY

In accordance with methods that are more-fully described herein, solder balls are formed by flash vaporizing a liquid coolant from the surface of atomized molten solder as the atomized molten solder is sprayed into a mist of the liquid coolant in an inert gas to cool and solidify the solder balls. The molten solder can be atomized with a stream jet, and the cooling liquid can be introduced via a mist-generating nozzle The liquid coolant can be made to contact the molten solder ball surface and flash vaporize thereon (rather than simple evaporation of the liquid coolant as a consequence of its exposure to the hot gas in the chamber) by, e.g., regulating the temperature and/or composition of the liquid coolant, regulating the droplet particle size of the liquid coolant and controlling the density of liquid coolant droplets in the mist or aerosol. Generally, the optimal and/or most-efficacious surface contact of the molten solder balls with the liquid coolant can be achieved by any combination of decreasing the temperature of the liquid coolant, producing smaller droplets of the liquid coolant in the mist and increasing the droplet density of the mist immediately adjacent to the molten solder ball surfaces. Ideal values for each of these variables are interdependent and also dependent on the temperature, size and composition of the atomized molten balls; and the adjustments, described above, should not be carried out to an extent that would prevent the liquid coolant from "flash" vaporizing upon contact with the molten solder ball.

The methods described herein provide a rapid and efficient method of cooling the surface of a solder melt. The flash vaporization of the liquid coolant droplets and the consequent rapid cooling of the solder balls can produce solidified solder spheres having very-fine grain size at their surfaces and improved sphericity. These methods can also be used to suppress formation of metal oxides on solder ball surfaces and to suppress the segregation of phases in the solder ball. Resultant solder spheres consequently can have smooth, blemish-free and homogeneous surface finishes in addition to having a very narrow particle size distribution. The enhanced control over the character and quality of the solder spheres offered by these methods is particularly advantageous when they are used in microelectronics featuring very-small spacing of components and having very-fine dimensional tolerances. Moreover, the enhanced cooling of the solder spheres provided by the flash vaporization enables a smaller apparatus with a smaller atomization chamber to be used because the solder spheres need less time (and a shorter path) traveling through the inert gas before their surfaces are sufficiently solidified to contact a collection surface without damaging their shape.

BRIEF DESCRIPTION OF THE DRAWINGS

The FIGURE is an illustration of an apparatus for use in practicing the methods of this invention.

The foregoing and other features and advantages of the invention will be apparent from the following, more-particular description. The drawing is not necessarily to scale, emphasis instead being placed upon illustrating particular principles, discussed below.

DETAILED DESCRIPTION

The invention provides an apparatus and a method for rapidly cooling molten metal droplets for use in conjunction with one of a number of stream-jetting manufacturing techniques used in the production of metallic powders, particles, granules and spheres. More particularly, solder melt can be rapidly cooled with this method and apparatus to produce solder alloy powders and solder spheres.

One embodiment of an apparatus for forming solid metal balls or particles, particularly solder balls, in accordance with the methods described herein is illustrated in the FIGURE. The apparatus includes a stream jet 11 including a jetting cartridge 12 filled with molten solder 14 at one end of an enclosure 16 (e.g., a flexible polyethylene tube). Molten solder droplets 18 are emitted in a stream from the cartridge 12 through the enclosure 16 with spray nozzles 20 positioned within the enclosure 16 to spray a mist of a liquid coolant into the path of the molten solder droplets 18. The liquid coolant forms a pool 22 at the bottom of the enclosure 16 in which the solder balls land after they have solidified. The solder balls are then collected in a receptacle 24 within a closed coolant reservoir 26, which is likewise filled with the liquid coolant. The liquid coolant is circulated from the closed coolant reservoir 26 through a five-micron filter 28, through a high-pressure pump 30, and then through a heat exchanger 32 cooled by a closed-loop glycol chiller 34 before the liquid coolant re-enters the enclosure 16, where it is fed through the nozzle 20 arrays.

Production of solder alloy powders and spheres is typically accomplished using a stream jetting technique, such as atomization, in an inert atmosphere. The basic stream-jetting technique is an application of controlled Raleigh breakup. The molten solder 14 is ejected through a round opening 35 in a thin metal plate (typically stainless steel or molybdenum) at a pressure of between 3 and 30 psi (21 to 210 kPa). The pressure used is determined by a variety of equations dealing with the fluid dynamics properties of the molten metal. The size of the aperture 35 is determined by the Raleigh relationship of $S=1.89D$, where the desired sphere size, $S$, is approximately 1.89 times the diameter of the aperture opening. A periodic function varying in frequency from approximately 1,000 Hz to 50,000 Hz is imparted onto the stream by an electromechanical transducer 36 that makes contact with the molten solder 14 inside the jetting cartridge 12 (a closed stainless-steel vessel containing the molten solder and having an opening in its bottom to accommodate the jetting aperture). The transducer 36 can be a magnetostrictive transducer, such as those manufactured by Etrema USA in Ames, Iowa.

Inert gases are used to create a production environment that minimizes oxygen concentration and its oxidizing effects on surfaces of the molten solder droplets 18. Solder alloy particles and spheres are particularly susceptible to the oxidizing effects of oxygen during and after production because solder is composed mostly of soft base metals, such as lead, tin, silver, bismuth, indium, antimony, cadmium and combinations thereof.

In other cases, a non-flammable and nonreactive inert gas is desirable as an atmosphere if contamination of the product is a problem. Argon and nitrogen are examples of suitable nonreactive cooling gases. Nitrogen is particularly desirable in cases of solder powder and solder sphere production, wherein a non-oxidizing atmosphere with a low oxygen concentration can be used to suppress formation of oxide films on surfaces of the solder particles or spheres. The nitrogen is above ambient atmospheric pressure so as to create a positive internal pressure and minimize backstreaming of oxygen into the chamber, which is deleterious to the sphere production. Typical nitrogen gauge pressure in the chamber is between 0.03 and 0.25 pounds per square inch (psi) (0.2 kPa to 1.7 kPa). Nitrogen is also used to pressurize the jetting cartridge 12 to push the molten solder 14 out through the orifice 35. In this case, the nitrogen pressurizes the cartridge 12 to a pressure between 3 and 30 psi (21 to 210 kPa).

Nitrogen functions not only as a shield gas suppressing formation of oxides but also as a primary means of thermal surface transfer that facilitates cooling and solidification of the molten solder droplets into particles and spheres. However, the ability of nitrogen to accomplish cooling at a rate that is rapid enough to produce smooth, blemish-free and homogeneous surface finishes on solidified solder droplets is limited. The heat-transfer coefficient of nitrogen and the absolute difference of the temperatures of the nitrogen and the molten solder droplets are limiting variables that prevent a sufficient rate and degree of cooling to achieve the desired smooth, blemish-free and homogeneous solder sphere surface finishes.

A significant improvement in the rate and degree of surface cooling of the molten droplet is achieved by introducing into the nitrogen gas a liquid coolant that has a low boiling point (i.e., a boiling point near the solidification temperature of the molten droplet or lower) and that is chemically inert with respect to the molten droplet. The liquid coolant may include, although is not limited to, de-ionized water, methanol, isopropanol, perfluorocarbons, methylene chloride, ethylene glycol, propylene glycol, and combinations thereof. Water (due to its low cost and high specific heat per unit mass) and water/glycol mixtures (in ratios ranging from 50:50 to 80:20) have been found to be particularly effective in these methods. Perfluorinated ethers, such as those marketed under the tradenames, FLUORINERT by 3M and GALDEN by Altimont, also work extremely well with the methods described herein. Alcohols will also work, though care should be taken to prevent air leaks from entering into the system and forming an explosive mixture with the alcohol in the presence of the hot surfaces of the molten solder.

The liquid coolant is passed through a steel tube-in-shell heat exchanger 32 to chill the coolant before it is fed to the spray nozzle plumbing. The heat exchanger 32, in turn, is cooled with a commercial glycol laboratory chiller 34. The liquid coolant is then introduced into the nitrogen atmosphere as a spray or aerosol formed by atomization of the liquid coolant as it is driven at a high pressure [e.g., at a fluid pressure of from about 400 to about 1500 psi (about 2.8 to about 10.3 MPa)] via a three-stage high-pressure pump 30 through round apertures having a diameter of about 0.004 to about 0.025 inches (about 0.1 to about 0.6 mm) in the nozzles 20 at a fluid pressure of from about 400 to about 2000 psi (about 2.8 to about 14 MPa). Suitable nozzles 20 include laser-drilled, synthetic-ruby, airless sprayer nozzles manufactured by Atomizing Systems, Inc. of HoHoKus, N.J., USA.

Liquid coolant droplets ranging in size from about 0.1 to about 3 microns ($\mu$m) in diameter are typically produced via this procedure. These coolant droplet sizes are typically two to four orders of magnitude smaller than the diameters of the molten droplets that are being emitted from the jetting aperture 35. The aerosol (mist) typically occupies between 1 and 20% of the open volume of the enclosure 16, with the balance typically being nitrogen gas. The combination of a high volume saturation density of coolant droplets combined with the small size of the coolant droplets relative to the size of the molten droplets and the selection of a liquid coolant with a suitable specific heat so as to flash boil at the temperature range of the molten droplets (and thereby extract heat from the molten droplets) are all among the factors that enable the rapid cooling of the molten droplets after atomization. If desired, the diameter of the coolant droplets can be adjusted by using nozzles 30 that have a different orifice size.

Rapid surface cooling of the molten solder droplets is achieved through intimate contact of the liquid coolant droplets with the surfaces of molten solder droplets. The heat of the solder droplets is transferred from molten solder droplet surfaces to the liquid coolant droplets upon contact to flash vaporize the coolant droplets, wherein transferred heat effects a near-instantaneous phase change of all of the liquid coolant from liquid to vapor. The phase change corresponding to the heat of vaporization of the liquid coolant rapidly removes the heat from surfaces of the molten solder droplets. This cooling cycle is repeated until thermal equilibrium between the solder droplet surfaces and the liquid coolant droplets is achieved. Where solder droplets having a diameter in the range of 4 to 40 mils (0.1 to 1 mm) are generated, solidification typically occurs between 3 and 20 feet (0.9 m to 6 m) from the aperture ejection with these methods.

The rapid rate of cooling facilitated by the vapor phase transformation of the liquid coolant droplets in contact with the molten solder droplets induces a rapid solidification of the solder droplet surfaces before metallurgical phase transformations or phase segregations can take place; the rapid cooling of the solder ball also produces a grain size that typically is more regular (smaller standard deviation) and 10–20% smaller that that which would be obtained absent the flash vaporization of the cooling liquid on the solder ball surfaces. These features facilitate the formation of physically smooth, blemish-free and homogeneous solder sphere surfaces.

The solder spheres that are thereby formed can then be used to surface mount electronic components as described in the Background section, above.

In another embodiment of the invention, the method of rapid cooling may be used to cool other metals, such as high-melting-point metals (e.g., copper and silver), to increase the rate and degree of surface cooling of molten droplets to achieve desired surface finishes. In these embodiments, the molten metal simply takes the place of the molten solder in the embodiments described above, and the methods are carried out in essentially the same manner.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The scope of the invention is limited only to the following claims and to the equivalents thereto.

What is claimed is:

1. A method for producing solder balls comprising the steps of:

atomizing molten solder to form a spray of molten solder balls; and generating a mist of liquid coolant droplets in the path of the molten solder ball spray, the liquid coolant having a temperature and droplet size that enable the coolant droplets to contact the molten solder balls and be flash vaporized upon contact with the solder balls.

2. The method of claim 1, wherein the molten solder spray is formed by atomizing the molten solder with a stream jet.

3. The method of claim 1, wherein the solder balls have diameters in the range of about 0.1 to about 1 mm.

4. The method of claim 1, wherein the solder balls are cooled and crystallized by the flash vaporization of the liquid coolant droplets.

5. The method of claim 1, wherein the solder comprises at least one of the following soft base metals: lead, tin, silver, bismuth, indium, antimony and cadmium.

6. The method of claim 1, wherein the molten solder balls are sprayed into an environment of an inert gas within which the mist of the liquid coolant is generated.

7. The method of claim 6, wherein the inert gas is nitrogen.

8. The method of claim 1, wherein the liquid coolant includes at least one of the following liquids: water, methanol, isopropanol, perfluorocarbons, methylene chloride, ethylene glycol and propylene glycol.

9. The method of claim 1, wherein the diameter of the liquid coolant droplets is in the range of about 0.2 to about 20 microns.

10. The method of claim 1, wherein at least the surfaces of the solder balls are solidified as a consequence of heat extraction due to the flash vaporization of the liquid coolant at the surfaces of the solder balls.

11. The method of claim 10, wherein the liquid coolant forms a pool in which the at-least-partially-solidified solder balls land.

12. A method for producing solidified metal balls or particles comprising the steps of:

atomizing molten metal to form a spray of molten metal droplets; and generating a mist of liquid coolant droplets in the path of the spray of molten metal droplets, the liquid coolant having a temperature and droplet size that enable the coolant droplets to contact the molten metal droplets and be flash vaporized upon contact with the molten metal droplets.

* * * * *